United States Patent [19]
Cawiezel et al.

[11] Patent Number: 5,948,733
[45] Date of Patent: *Sep. 7, 1999

[54] FLUID LOSS CONTROL

[75] Inventors: Kay E. Cawiezel, Longview, Tex.; Reinaldo C. Navarrete, Tulsa; Vernon G. Constien, Sperry, both of Okla.

[73] Assignee: Dowell Schlumberger Incorporated, Sugar Land, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/725,837

[22] Filed: Sep. 18, 1996

Related U.S. Application Data

[63] Continuation of application No. 08/281,786, Jul. 28, 1994, abandoned.

[51] Int. Cl.$^6$ ........................................................ C09K 3/00
[52] U.S. Cl. ............................ 507/212; 507/906; 507/922
[58] Field of Search ...................................... 507/212, 922, 507/906, 111

[56] References Cited

U.S. PATENT DOCUMENTS

| | | |
|---|---|---|
| 3,408,296 | 10/1968 | Kuhn et al. . |
| 3,601,194 | 8/1971 | Gallus ..................................... 166/283 |
| 4,289,632 | 9/1981 | Clear . |
| 4,686,052 | 8/1987 | Baranet et al. . |
| 4,997,581 | 3/1991 | Williamson et al. . |
| 5,054,554 | 10/1991 | Pearson . |
| 5,259,455 | 11/1993 | Nimerick et al. . |

OTHER PUBLICATIONS

Gray et al, Composition and Properties of Oil Well Drilling Fluids, (1980), pp. 579–582, Gulf Publishing Co.
Rogers, "Comparison and Properties of Oil Well Drilling Fluids" ($2^{nd}$ Edition) pp. 281–283, (1953).
Encyclopedia of Chemical Technology (Third Edition) vol. 6 (1979), pp. 191, 200–201.
Encyclopedia of Chemical Technology (Third Edition) vol. 15 (1981) pp. 416–419.
Rogers, Walter F., *Compositions and Properties of Oil Well Drilling Fluids,* (Third Edition), Gulf Publishing Co.; (1963) pp. 337 and 406.
*Dictionary of Scientific and Technical Terms,* (Fourth Edition), McGraw–Hill, pp. 362, 939, 1193, No Date Available.
*Encyclopedia of Science and Technology,* McGraw–Hill (1977) vol. 3, p. 171; vol. 8, p. 405.

*Primary Examiner*—Philip Tucker
*Attorney, Agent, or Firm*—John E. Vick, Jr.; Douglas Y'Barbo

[57] ABSTRACT

The invention, in one embodiment, relates to a fluid loss control additive or composition comprising a granular starch composition and fine particulate mica, in specified proportions. The invention further comprises a fracturing fluid containing a starch composition and mica, in a specified ratio. In yet a third embodiment, the invention comprises a method of fracturing a subterranean formation penetrated by a borehole, comprising injecting into the borehole and into contact with the formation, at a rate and pressure sufficient to fracture the formation, a fracturing fluid containing starch and mica, in specified ratios, and in an amount sufficient to provide fluid loss control.

31 Claims, No Drawings

FLUID LOSS CONTROL

This application is a continuation of application Ser. No. 08/281,786, filed on Jul. 28, 1994 now abandoned.

FIELD OF THE INVENTION

This invention relates to the recovery of hydrocarbon fluids from subterranean formations. More particularly, the invention relates to a novel fluid loss control additive combination for use in fracturing fluids, to a novel fracturing fluid containing such additive combination, and to a fracturing process utilizing the novel fracturing fluid.

BACKGROUND OF THE INVENTION

In the recovery of hydrocarbon values from subterranean formations, it is common practice, particularly in formations of low permeability, to fracture the hydrocarbon-bearing formation to provide flow channels to facilitate production of the hydrocarbons to the wellbore. In such fracturing operations, a fracturing fluid is hydraulically injected down a well penetrating the subterranean formation and is forced against the formation by pressure. By this procedure, the formation is forced to crack or fracture, and a proppant is placed in the fracture. The fracture provides improved flow of the recoverable fluid, i.e., oil, gas, or water, into the well. While a wide variety of fracturing fluids have been used, fracturing fluids customarily comprise a thickened or gelled aqueous solution which has suspended therein "proppant" particles which are substantially insoluble in the fluids of the formation. Proppant particles carried by the fracturing fluid remain in the fracture created, thus propping open the fracture when the fracturing pressure is released and the well is put in production. Suitable proppant materials include, but are not limited to, sand, walnut shells, sintered bauxite, or similar materials. As will be understood by those skilled in the art, the "propped" fracture provides a larger flow channel to the well bore through which an increased quantity of hydrocarbons can flow, thereby increasing the production rate of a well.

A problem common to many hydraulic fracturing operations is the loss of fracturing fluid into the porous matrix of the formation, particularly in formations of high permeability, e.g., formations having a permeability of greater than 2 md. Fracturing fluid loss is objectionable, not only because of cost consider-ations, but especially because it limits the fracture geometry which can be created in high permeability formations. In general, fracturing fluid loss depends on the properties of the rock in the formation, the properties of the fracturing fluid, the shear rate in the fracture, and the pressure difference between the fluid injected and the pore pressure of the rock matrix. In this regard, the properties of the fracturing fluid are those exhibited by the fluid in the formation as influenced, inter alia, by the temperature and shear history to which the fluid has been subjected in its travel down the well bore and through the fracture.

Thorough analysis of the problem of fracturing fluid loss in high permeability formations reveals that it is necessary to reduce "spurt". As used herein, the term "spurt" refers generally to the volume of fluid lost during fracturing because of early leak off of fracturing fluid before pores of the formation can be plugged, and/or an external filtercake on the surface formed. In the past, a variety of additives to the fluid have been employed, most being selected or designed to generate an external low-permeability filtercake quickly, under little or no shear stress (usually referred to as static conditions) in order to cover the pores and stop spurt. This approach is unsatisfactory since high shear stresses eliminate or severely limit the formation of external filtercake.

In general, the higher the permeability of a rock, the greater the spurt is likely to be. However, it has been determined that during hydraulic fracturing, spurt occurs principally at or near the advancing tip of the fracture, where new rock surface is being generated. The shear stresses that the fracturing fluid exerts on the surface of the rock are greater proximate the tip of the fracture because of the narrower fracture gap in that location. As indicated, the high shear stresses prevent the formation of external filtercakes of polymer and/or fluid loss additives by eroding the surface of the cake in contact with the fracturing fluid. Accordingly, to be effective, a fluid loss additive must be able to stop spurt under high shear rates.

Williamson et al (U.S. Pat. No. 4,997,581) describe the prior art utilization of a variety of inorganic solids, natural starches, and combinations of finely divided inorganic solids with natural starches. All these compositions are deemed by these patentees to be deficient for controlling fracturing fluid loss in moderate to high permeability formations. While these patentees attempt to provide an effective additive by the use of blends of natural starches and modified starches, their blends have limited application. For example, for formations having high permeability and high temperatures, e.g., 300° F., natural and modified starches may not effectively plug the pores in the fracture walls. Finally, additives suggested by other workers in the art, while providing some fluid loss control, often are excessive in cost.

Accordingly, there has existed a need for a low cost additive or fracturing fluid which provides fracturing fluid loss control, and a method of fracturing a subterranean formation characterized by reduced fluid loss, under a variety of conditions which include both high permeability and high temperature. The invention answers this need.

SUMMARY OF THE INVENTION

The invention, therefore, in one embodiment, relates to a fluid loss control additive or composition comprising a granular starch composition and fine particulate mica combined in a specified ratio or proportion. Preferably, the fluid loss control composition of the invention contains an additional finely divided inorganic solid, or mixture of such solids. The additive components of the invention may be added directly to a suitable fracturing fluid, or, for ease of formulation, the additive components of the invention may be suspended in a suitable diluent or carrier liquid, the fluid loss control additive-carrier liquid combination then being combined with the fracturing fluid. The invention thus further comprises a fracturing fluid containing a granular starch composition and fine particulate mica, in a specified ratio, and preferably contains the additional inorganic solid (s) mentioned, these components being supplied in the fracturing fluid in amount and proportion sufficient to provide fluid loss control.

In another embodiment, the invention comprises a method of fracturing a subterranean formation penetrated by a borehole, comprising injecting into the borehole and into contact with the formation, at a rate and pressure sufficient to fracture the formation, a fracturing fluid composition containing a granular starch composition and finely divided mica combined in a ratio specified more fully hereinafter and in an amount sufficient to provide fracturing fluid loss control. Preferably, the fracturing fluid used also contains a finely divided inorganic solid or solids.

DETAILED DESCRIPTION OF THE INVENTION

Any suitable granular starch or mixture of starches may be used in the invention. Accordingly, as used hereinafter, the term "starch" composition" is understood to include one or more natural starches, one or more chemically modified starches, and mixtures of one or more natural and/or chemically modified starches. Natural starches which may be employed in the invention include, but are not limited to, those of potato, wheat, tapioca, rice, and corn, the preferred starch being potato starch. Most preferably, pre-gelatinized starches, particularly pre-gelatinized potato starch, are employed. Pre-gelatinized starches may be obtained commercially or they may be prepared by pre-gelatization treatment. For pre-gelatinization, the chosen starch granules are heated in water to a point where the starch granules swell irreversibly. Upon cooling, this swollen structure is retained. The use of pre-gelatinized starches yields an important advantage to the combination of the invention, since these materials are stable at higher temperatures in the formation, e.g., up to 300° F. Chemically modified starches are those derived from natural starches by chemical reaction of a natural starch with a suitable organic reactant. Chemically modified starches which may be used in the invention include, but are not limited to, carboxymethyl starch, hydroxyethyl starch, hydroxypropyl starch, acetate starch, sulfamate starch, phosphate starch, nitrogen modified starch, starch crosslinked with aldehydes, epichlorohydrin, borates, and phosphates, and starches grafted with acrylonitrile, acrylamide, acrylic acid, methacrylic acid, maleic anhydride, or styrene. Preferred among the modified starches are hydroxypropyl and carboxymethyl starches. While granule size of the starch particles is not critical, commercially available sizes being suitable, a preferred range of dry particle sizes would be from about 5 $\mu$m to about 150 $\mu$m.

The particular mica employed in the invention is a matter of choice. As used herein, the term "mica" refers generally to natural and synthetic silicate compositions of varying chemical composition characterized by being cleavable into thin sheets or plates that are flexible and elastic. Suitable micas include muscovite, phlogophite, biotite, zinnwadite, and pegmatite. As indicated, fine particulate mica is required. Preferably, the median particle size of the mica is smaller than about 50 $\mu$m, most preferably below 32 $\mu$m.

If an additional inorganic solid or solids (i.e., additional and different from mica) are employed along with the primary components, the median particle size thereof will also be, as indicated, suitably small, generally in the same range as the mica particles, and preferably the median particle size will be below about 50 $\mu$m. Preferred finely divided inorganic solids include those of silica, limestone (CaCO$_3$), rock salt, alumina, talc, and kaolin.

The ratio of starch composition to mica, by weight, will range from about 11:1 to about 1:14, preferably from about 5:1 to about 1:7. If additional finely divided inorganic solid or solids are employed, the inorganic solid(s) may replace some starch or mica in the overall solids content of the compositions. The finely divided inorganic solid(s) will preferably have a weight ratio of such solid (or solids) to the mica of from about 1:1 to about 5:1, the weight ratio of the finely divided solids to the starch composition thus being from about 7:1 to about 7:3. While not wishing to be bound by any theory of invention, it is believed that the somewhat deformable starch particles will partially fill pore throats in the formation, the mica particles, which are platelets, filling the remainder of the throats or voids. The invention thus provides a bimodal pore filling mechanism characterized by a deformable particle having improved resistance to a high shear fracture fluid, along with small particles which can aid in sealing the pores. In this sense, the ratios of mica to starch mentioned are critical since, at ratios of mica to starch significantly below those designated, the voids in the fracture faces cannot be fully sealed, and, at insufficient ratios of starch to mica, the sealing of the larger pore throats may not be achieved. The additional finely divided inorganic solids, when employed, will be used primarily in very high permeability formations, e.g., greater than 100 md, where they are beneficial because of their rigidity.

Optionally, but preferably, the starch composition-mica mixture is combined with a surfactant to aid dispersion of the dry starch-mica mixture into the fracturing fluid. Useful surfactants include lower HLB (lipophilic) surfactants in the HLB range of about 1–11, with the HLB range of 4–10 being preferred. Representative useful surfactants include sorbitan monooleate, poloxyethylene sorbitan monooleate, ethoxylated butanol, and ethoxylated nonyl phenol, as well as various blends of these surfactants. The surfactants typically will be used at a level of about 0.1 to 10 percent by weight, and preferably about 0.5 to 5 percent by weight.

In practice, the additive components of the invention are normally dispersed, with the aid of the surfactant, into a suitable diluent or carrier fluid. Suitable carrier fluids include low toxicity mineral oil, diesel fuel, kerosene, and mixtures thereof. Preferably, the carrier and additive components will be combined in such manner that the starch will be present in an amount of from about 2 percent to about 45 percent by weight, the mica being present in an amount of from about 8 percent to about 25 percent by weight, all percentages based on the total weight of the carrier and components. If additional inorganic solid(s) are present, they will be present in an amount of from about 8 percent to about 25 percent by weight, all percentages again based on the total weight of the carrier and components. The combination additive composition plus carrier is then easily mixed with or dispersed into a fracturing fluid.

The particular fracturing fluid employed with the additive components of the invention is largely a matter of choice and forms no part of the present invention. For example, fluids may comprise uncrosslinked solutions of cellulose or guar, or may be borate, titanium, or zirconium crosslinked fluids, the particular fluid chosen being determined by such considerations as treating temperature and concentration of proppant to be carried. As those skilled in the art will be aware, however, the fracturing fluid and additive compositions must be compatible in the sense that they do not react with one another or otherwise deleteriously interfere with the designed functions of each. Preferably, the additive compositions of the invention are employed with aqueous based fracturing fluids, although this is not a requirement. Particularly preferred are the type of fracturing fluids described by Nimerick, Crown, McConnell, and Ainley in U.S. Pat. No. 5,259,455, and those disclosed in U.S. Pat. No. 4,686,052.

As noted, the amount of additive components supplied in the fracturing fluid will be that amount sufficient or effective to provide the desired fluid loss control. This concentration of additive will be varied depending on the permeability and other characteristics of the particular formation. Typically, from about 10 to 75 lbs/1000 gallons of the additive components of the invention are dispersed in the fracturing fluid, with about 20 to 60 lbs/1000 gallons of the additive components representing a preferred range of addition. As indicated, the concentrations of each of the additive components in the fracturing fluid and the ratios thereof are important if effective sealing of the pores is to be obtained. In general, the fracturing fluid will contain from about 2 lbs. to about 28 lbs. of starch composition and from about 2.5 lbs. to about 28 lbs. of mica, per 1000 gallons of the fracturing fluid. If an additional inorganic solid or solids are employed, the concentration of such solid(s) will range from about 4.0 lbs. to about 15.0 lbs. per 1000 gallons of fracturing fluid, preferably from about 5.0 lbs. to about 10.0 lbs. per 1000 gallons.

Following the practice of the invention, as the fracture is created in the formation, the fluid loss control additive is deposited in the pores in the walls of the fracture to form a seal which controls the leak-off rate and confines the fracturing fluid to the fracture. Therefore, with the same fluid volume, a longer fracture may be obtained. Again, contrary to what might be expected, experiments indicate that use of lower viscosity fracturing fluids containing the additive components of the invention gives better fluid loss control than when more viscous fluids are employed.

In order to determine the fluid loss control properties of compositions according to the invention, the following experiments were conducted. The experiments were carried out in dynamic fluid loss cells which were modifications of the unit describe by Roodhart, L. P., SPEJ, (October 1985), pp. 629–636. In the modified cells, dynamic fluid loss measurements were made while the test fluid flowed in slot geometry, a circular area in only one of the slot walls being porous. In each case, the surface area (4.97 cm$^2$)and the length (2.54 cm) of the core employed were the same. The width of the slot was the same as the diameter of the core. The variables for each run were thus temperature, pressure, core type and permeability, and shear rate.

In the experiments, aqueous fracturing fluids of the guar containing type were prepared containing starch composition and mica, or starch, mica, and silica flour, in the proportions hereinafter indicated. The starch, mica, and silica, if present, were first slurried with a small quantity of diesel No. 2, organophilic clay, and surfactant, for ease of dispersion in the fracturing fluid. Each fracturing fluid contained typical additives commonly present in such fluids, such as antifoam, bactericide, friction reducer, and delay agent. In the tables of results for each experiment, to demonstrate the importance of the additive components of the invention, comparisons are made, however, only with runs of identical or analogous fracturing fluid not containing the additive components, under the same or substantially similar test conditions, the only significant differences for the "control" runs being the absence of the organophilic clay and surfactant, and somewhat lower content of Diesel No. 2.

In all cases, the shear rate was varied, as follows:
Between 0 sec. to 43 sec.—380 s$^{-1}$
Between 43 sec. to 6 min.—304 s$^{-1}$
Between 6 min. to 16 min.—190 s$^{-1}$
Between 16 min. to 26 min.—133 s$^{-1}$
Between 26 min. to 45 min.—114 s$^{-1}$ The results of the experiments, with relevant variables, are as follows:

I

In these runs, a Barea sandstone core having a specific per-meability of 1.90 was employed, and the temperature was 150° F. Column A lists the components of the "control" fracturing fluid composition, while Column B lists those of the invention.

| A | | B | |
|---|---|---|---|
| Name | Concentration | Name | Concentration |
| Guar | 25.000 lb/1000 gal. | Guar | 25.000 lb/1000 gal. |
| KC1 | 167.000 lb/1000 gal. | KC1 | 167.000 lb/1000 gal. |
| Antifoam | 0.250 gal/1000 gal. | Antifoam | 0.250 gal/1000 gal. |
| Bactericide | 0.500 gal/1000 gal. | Bactericide | 0.500 gal/1000 gal. |
| Friction Reducer | 1.000 gal/1000 gal. | Friction Reducer | 1.000 gal/1000 gal. |
| Boric Acid | 5.000 lb/1000 gal. | Boric Acid | 5.000 lb/1000 gal. |
| Caustic Soda | 10.000 lb/1000 gal. | Caustic Soda | 10.000 lb/1000 gal. |
| Delay Agent | 20.00 lb/1000 gal. | Delay Agent | 20.00 lb/1000 gal. |
| Diesel No. 2 | 4.400 lb/1000 gal. | Diesel No. 2 | 7.85 lb/1000 gal. |
| | | Potato Starch | 25.000 lb/1000 gal. |
| | | Mica | 5.000 lb/1000 gal. |
| | | Clay | 0.54 lb/1000 gal. |
| | | Surfactant | 0.150 lb/1000 gal. |

Fluid loss amounts (total), in milliliters, after the times indicated, were as follows:

| A | | B | |
|---|---|---|---|
| minutes | ml. | minutes | ml. |
| 0.0 | 0 | 0.0 | 0 |
| 0.9 | 1.3 | 0.9 | 1.1 |
| 1.5 | 1.5 | 1.5 | 1.2 |
| 9.1 | 3.3 | 9.1 | 2.8 |
| 30.1 | 5.4 | 30.1 | 4.6 |

Accordingly, at relatively low specific permeability, the invention composition exhibits improved fluid loss control.

II

In this set, the Barea sandstone "control" core had a specific permeability of 2.08, while the core used with the composition of the invention had a specific permeability of 2.03. The temperature employed was 250° F., and the amount of guar was increased to 30 lbs/1000 gallons. All other parameters were the same as Run I.

Fluid loss amounts (total), in milliliters, were, as follows:

| A | | B | |
|---|---|---|---|
| minutes | ml. | minutes | ml. |
| 0.0 | 0 | 0.0 | 0 |
| 0.9 | 1.0 | 0.9 | 0.5 |
| 1.5 | 1.2 | 1.5 | 0.9 |
| 9.1 | 3.3 | 9.2 | 2.5 |
| 30.2 | 6.1 | 30.1 | 4.6 |

III

In this run, the Barea sandstone "control" core had a specific permeability of 9.85, while the core used with the composition of the invention had a specific permeability of 10.11. All other parameters were the same as Run I. Fluid loss amounts (total), in milliliters, were, as follows:

| A | | B | |
|---|---|---|---|
| minutes | ml. | minutes | ml. |
| 0.0 | 0 | 0.0 | 0 |
| 0.9 | 2.3 | 0.9 | 1.2 |
| 1.5 | 2.3 | 1.5 | 1.1 |
| 9.1 | 3.7 | 9.2 | 2.3 |
| 30.1 | 5.5 | 30.1 | 4.5 |

IV

The variables of this set correspond to those of run II, except that the Barea sandstone "control" core had a specific permeability of 45.86 and the core used with the composition of the invention had a specific permeability of 49.28. Fluid loss amounts (total), in milliliters, were, as follows:

| A | | B | |
|---|---|---|---|
| minutes | ml. | minutes | ml. |
| 0.0 | 0 | 0.0 | 0 |
| 0.9 | 1.9 | 0.9 | 1.1 |
| 1.5 | 2.3 | 1.5 | 1.3 |
| 9.1 | 4.6 | 9.2 | 3.1 |
| 30.2 | 7.6 | 30.1 | 5.7 |

V

In these runs, the "control" core was a Barea sandstone having a specific permeability of 200.42, the core used with the composition of the invention had a specific permeability of 199.60, and temperature was 150° F. Column A sets forth the base fracturing fluid composition "control" while Column B defines the invention fluid.

| A | | B | |
|---|---|---|---|
| Name | Concentration | Name | Concentration |
| Guar | 25.000 lb/1000 gal. | Guar | 25.000 lb/1000 gal. |
| KCl | 167.000 lb/1000 gal. | KCl | 167.000 lb/1000 gal. |
| Antifoam | 0.250 gal/1000 gal. | Antifoam | 0.250 gal/1000 gal. |
| Bactericide | 0.500 gal/1000 gal. | Bactericide | 0.500 gal/1000 gal. |
| Friction Reducer | 1.000 gal/1000 gal. | Friction Reducer | 1.000 gal/1000 gal. |
| Boric Acid | 5.000 lb/1000 gal. | Boric Acid | 5.000 lb/1000 gal. |
| Caustic Soda | 10.000 lb/1000 gal. | Caustic Soda | 10.000 lb/1000 gal. |
| Delay Agent | 20.00 lb/1000 gal. | Delay Agent | 20.00 lb/1000 gal. |
| Diesel No. 2 | 4.400 lb/1000 gal. | Diesel No. 2 | 7.850 lb/1000 gal. |
| | | Potato Starch | 2.000 lb/1000 gal. |
| | | Silica | 14.000 lb/1000 gal. |
| | | Mica | 14.000 lb/1000 gal. |
| | | Clay | 0.600 lb/1000 gal. |
| | | Surfactant | 0.150 lb/1000 gal. |

Fluid loss amounts (total), in milliliters, after the times indicated, were as follows:

| A | | B | |
|---|---|---|---|
| minutes | ml. | minutes | ml. |
| 0.0 | 0 | 0.0 | 0 |
| 0.9 | 7.8 | 0.9 | 2.8 |
| 1.5 | 8.1 | 1.5 | 3.0 |
| 9.2 | 9.4 | 9.1 | 4.2 |
| 30.1 | 11.7 | 30.2 | 5.6 |

VI

In this run, the Barea sandstone "control" core had a specific permeability of 407.13, while the core used with the composition of the invention had a specific permeability of 404.93. All other parameters were the same as Run V. Fluid loss amounts (total), in milliliters, were, as follows:

| A | | B | |
|---|---|---|---|
| minutes | ml. | minutes | ml. |
| 0.0 | 0 | 0.0 | 0 |
| 0.9 | 37.0 | 0.9 | 7.8 |
| 1.5 | 39.0 | 1.5 | 8.0 |
| 9.2 | 39.8 | 9.1 | 8.8 |
| 30.1 | 40.6 | 30.2 | 9.8 |

In sum, the tests indicate good fluid loss control capability at high shear rates and across a wide spectrum of specific permeability and temperature.

What is claimed is:

1. A fluid loss control additive having a bimodal particle size distribution for use in a subterranean formation for reducing dynamic fluid loss into the subterranean formation, the additive comprising a starch composition and fine particulate mica, the weight ratio of starch composition to mica being from about 11:1 to about 1:14, the mica having a particle size in the range of less than about 50 $\mu$m, and the starch composition comprising particles of starch larger than the mica particles, wherein the starch composition and fine particulate mica are adapted to cooperate as a bimodal particle size distribution in a flowing fluid to form a barrier to fluid flow into the formation under dynamic conditions during fracturing to reduce fluid loss into the subterranean formation.

2. The additive of claim 1 containing from about 15 percent to about 50 percent by weight, based on the total weight of the additive, of an additional finely divided inorganic solid or solids.

3. A bimodal fluid loss control composition for reducing dynamic fluid loss into a subterranean formation comprising a carrier liquid containing from about 2 percent to about 45 percent by weight of starch composition and from 8 percent to 25 percent by weight of fine particulate mica, based on the total weight of the composition, the weight ratio of starch composition to mica being from about 11:1 to about 1:14, the mica having a particle size in the range of less than about 50 $\mu$m, the starch composition having particles larger than said mica particle size, wherein the starch composition and fine particulate mica cooperate under dynamic conditions during fracturing to reduce fluid loss into the subterranean formation.

4. The composition of claim 3 containing from about 8 percent to about 25 percent by weight, based on the total weight of the composition, of an additional finely divided inorganic solid or solids.

5. A fracturing fluid composition having a bimodal particle size distribution for reducing dynamic fluid loss into a subterranean formation during fracturing comprising a fracturing fluid containing from about 2 lbs. to about 28 lbs. of starch per 1000 gallons of the fracturing fluid and from about 2.5 lbs. to about 28 lbs. of mica per 1000 gallons of the fracturing fluid, the weight ratio of starch composition to mica being from about 11:1 to about 1:14, wherein the starch composition and fine particulate mica cooperate to reduce fluid loss into the subterranean formation.

6. The fracturing fluid composition of claim 5 containing from about 4 lbs. to about 10 lbs. of an additional finely divided inorganic solid or solids per 1000 gallons of fracturing fluid.

7. A fracturing fluid composition for reducing dynamic fluid loss into a subterranean formation, the composition having a bimodal particle size distribution comprising a fracturing fluid having
(a) from about 2 lbs. to about 28 lbs. of starch composition per 1000 gallons of the fracturing fluid, and
(b) from about 2.5 lbs. to about 28 lbs. of mica, per 1000 gallons of the fracturing fluid,
(c) the weight ratio of starch composition to mica being from about 11:1 to about 1:14,
(d) wherein the starch composition and fine particulate mica cooperate to reduce fluid loss into the subterranean formation during fracturing, the fracturing fluid loss composition being capable of being injected into the borehole and into contact with the formation at a rate and pressure sufficient to fracture the formation.

8. The fluid of claim 7 wherein the fracturing fluid composition comprises an additional finely divided inorganic solids.

9. The fluid of claim 8 wherein the additional finely divided inorganic solid or solids comprises from about 4 pounds to about 15 pounds per 1000 gallons of the fracturing fluid composition.

10. A fracturing fluid composition comprising a fracturing fluid containing from about 2 percent to about 45 percent by weight of starch composition and from 8 percent to 25 percent by weight of fine particulate mica, based on the total weight of the composition, the weight ratio of starch composition to mica being from about 11:1 to about 1:14.

11. The composition of claim 10 containing from about 8 percent to about 25 percent by weight, based on the total weight of the composition, of an additional finely divided inorganic solid or solids.

12. A fracturing fluid composition comprising a fracturing fluid containing from about 2 lbs. to about 28 lbs. of starch composition and from about 2.5 lbs. to about 28 lbs. of mica, per 1000 gallons of the fracturing fluid, the weight ratio of starch composition to mica being from about 11:1 to about 1:14.

13. The fracturing fluid composition of claim 12 containing from about 4 lbs. to about 10 lbs. of an additional finely divided inorganic solid or solids per 1000 gallons of fracturing fluid.

14. The composition of claim 3 wherein the weight ratio of starch composition to mica is from about 5:1 to about 7:1.

15. The composition of claim 4 wherein the weight ratio of starch composition to mica is from about 5:1 to about 7:1, and the additional finely divided inorganic solid or solids are present in a ratio of from about 1:1 to about 5:1 with respect to the mica, and from about 7:1 to about 7:3 with respect to the starch composition.

16. The composition of claim 10 wherein the weight ratio of starch composition to mica is from about 5:1 to about 7:1.

17. The composition of claim 11 wherein the weight ratio of starch composition to mica is from about 5:1 to about 7:1, and the additional finely divided inorganic solid or solids are present in a ratio of from about 1:1 to about 5:1 with respect to the mica, and from about 7:1 to about 7:3 with respect to the starch composition.

18. The composition of claim 10 wherein the starch and mica have a bimodal particle size distribution, starch particles being larger than the mica particles, and the weight ratio of starch composition to mica is from about 5:1 to about 7:1.

19. The composition of claim 11 wherein the starch and mica have a bimodal particle size distribution, starch particles being larger than the mica particles, the weight ratio of starch composition to mica is from about 5:1 to about 7:1, and the additional finely divided inorganic solid or solids are present in a ratio of from about 1:1 to about 5:1 with respect to the mica, and from about 7:1 to about 7:3 with respect to the starch composition.

20. The composition of claim 12 wherein the starch and mica have a bimodal particle size distribution, starch particles being larger than the mica particles, and the weight ratio of starch composition to mica is from about 5:1 to about 7:1.

21. The composition of claim 13 wherein the starch and mica have a bimodal particle size distribution, starch particles being larger than the mica particles, the weight ratio of starch composition to mica is from about 5:1 to about 7:1, and the additional finely divided inorganic solid or solids are present in a ratio of from about 1:1 to about 5:1 with respect to the mica, and from about 7:1 to about 7:3 with respect to the starch composition.

22. The composition of claim 15 in which the additional finely divided solid comprises silica.

23. The composition of claim 17 in which the additional finely divided solid comprises silica.

24. The composition of claim 19 in which the additional finely divided solid comprises silica.

25. The composition of claim 21, in which the additional finely divided solid comprises silica.

26. The composition of claim 2 in which the additional finely divided solid comprises silica.

27. The composition of claim 4 in which the additional finely divided solid comprises silica.

28. The composition of claim 6 in which the additional finely divided solid comprises silica.

29. The composition of claim 8 in which the additional finely divided solid comprises silica.

30. The composition of claim 9 in which the additional finely divided solid comprises silica.

31. The composition of claim 11 in which the additional finely divided solid comprises silica.

* * * * *